(12) United States Patent
Kitagawa et al.

(10) Patent No.: US 10,690,902 B2
(45) Date of Patent: Jun. 23, 2020

(54) IMAGE PROCESSING DEVICE AND MICROSCOPE SYSTEM

(71) Applicant: OLYMPUS CORPORATION, Hachioji-shi, Tokyo (JP)

(72) Inventors: Hisao Kitagawa, Tokyo (JP); Yusuke Yamashita, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 23 days.

(21) Appl. No.: 16/160,244

(22) Filed: Oct. 15, 2018

(65) Prior Publication Data

US 2019/0121112 A1   Apr. 25, 2019

(30) Foreign Application Priority Data

Oct. 25, 2017   (JP) .................................. 2017-205693

(51) Int. Cl.
*H04N 7/18* (2006.01)
*G02B 21/36* (2006.01)
(Continued)

(52) U.S. Cl.
CPC ....... *G02B 21/367* (2013.01); *G02B 21/0076* (2013.01); *G06K 9/0014* (2013.01); *G06T 7/73* (2017.01); *G06T 11/206* (2013.01); *G06T 15/08* (2013.01); *G06T 2200/24* (2013.01); *G06T 2207/10056* (2013.01); *G06T 2207/20104* (2013.01); *G06T 2207/30024* (2013.01); *G06T 2219/008* (2013.01); *H04N 7/18* (2013.01)

(58) Field of Classification Search
CPC .............. G02B 21/367; G02B 21/0076; G06K 9/0014; H04N 7/18
USPC .......................................................... 348/79
See application file for complete search history.

(56) References Cited

U.S. PATENT DOCUMENTS

| 2011/0090223 A1* | 4/2011 | Eichhorn ........... G06K 9/00201 345/422 |
| 2012/0002033 A1* | 1/2012 | Yamane ............... G02B 21/365 348/79 |

(Continued)

FOREIGN PATENT DOCUMENTS

| JP | 2018115875 A | 7/2018 | |
| WO | 2009110614 A1 | 9/2009 | |
| WO | WO-2018158810 A1 * | 9/2018 | ............. G01N 21/41 |

*Primary Examiner* — Michael Lee
(74) *Attorney, Agent, or Firm* — Holtz, Holtz & Volek PC

(57) ABSTRACT

Visual observation of morphological features of a cell group or individual cells acquired in 3D image data is facilitated, thus improving observation accuracy. Provided is an image processing device that generates, on the basis of a plurality of 2D images acquired by a microscope at different focus positions on a cell clump, 3D images of respective cells constituting the cell clump, that processes the generated 3D images and analyzes feature amounts on the basis of at least one measurement parameter, that displays analysis results in a graph, that allows a user to select a region of interest on the displayed graph, and that generates, from the 3D images that correspond to the plurality of cells that are included in the selected region of interest, 2D display images each in a plane with reference to an axis that is determined on the basis of a shape feature of the corresponding cell and displays the 2D display images in a list.

17 Claims, 12 Drawing Sheets

(51) Int. Cl.
  *G06T 11/20* (2006.01)
  *G06K 9/00* (2006.01)
  *G06T 15/08* (2011.01)
  *G06T 7/73* (2017.01)
  *G02B 21/00* (2006.01)

(56) References Cited

U.S. PATENT DOCUMENTS

| | | | |
|---|---|---|---|
| 2012/0007977 A1* | 1/2012 | Yamamoto | G02B 21/367 348/79 |
| 2014/0022236 A1* | 1/2014 | Liu | G02B 21/367 345/419 |
| 2015/0143274 A1* | 5/2015 | Hecht | G02B 21/008 715/771 |
| 2018/0204047 A1 | 7/2018 | Yamashita | |

* cited by examiner

FIG. 4

TABLE

| LABEL (OBJECT ID) | CENTER POSITION INFORMATION | CIRCUMSCRIBED RECTANGLE |
|---|---|---|
| 1 | (X1, Y1, Z1) | (X1_d, Y1_d, Z1_d) |
| 2 | (X2, Y2, Z2) | (X2_d, Y2_d, Z2_d) |
| 3 | (X3, Y3, Z3) | (X3_d, Y3_d, Z3_d) |
| 4 | (X4, Y4, Z4) | (X4_d, Y4_d, Z4_d) |
| ⋮ | ⋮ | ⋮ |
| k | (Xk, Yk, Zk) | (Xk_d, Yk_d, Zk_d) |
| ⋮ | ⋮ | ⋮ |
| n | (Xn, Yn, Zn) | (Xn_d, Yn_d, Zn_d) |

IMAGE PROCESSING DEVICE AND MICROSCOPE SYSTEM

CROSS-REFERENCE TO RELATED APPLICATIONS

This application is based on Japanese Patent Application No. 2017-205693, the contents of which are incorporated herein by reference.

TECHNICAL FIELD

The present invention relates to an image processing device and a microscope system.

BACKGROUND ART

In the related art, there is a known observation system in which one or more cells are arrayed in a single layer on the bottom surface of a container, and fluorescence or luminescence signals produced in the cells are captured by a camera (for example, see WO 2009/110614).

In this observation system, the fluorescence or luminescence signals are measured, the cells are identified from the distribution and the intensities thereof, and gallery display in which 2D images of the identified cells are arranged and displayed in a list is used, thereby making it possible to facilitate visual confirmation of the cells, which are measurement targets.

SUMMARY OF INVENTION

An object of the present invention is to provide an image processing device and a microscope system that facilitate visual observation of morphological features of a cell group or individual cells acquired in 3D image data, thus making it possible to improve the observation accuracy.

According to one aspect, the present invention provides an image processing device including at least one processor that is provided with hardware, wherein the at least one processor is configured to: generate, on the basis of a plurality of 2D images acquired by a microscope at different focus positions on a cell clump, 3D images of respective cells constituting the cell clump; process the generated 3D images and analyze feature quantities on the basis of at least one measurement parameter; display analysis results in a graph; allow a user to select a region of interest on the displayed graph; and generate, from the 3D images that correspond to the plurality of cells that are included in the selected region of interest, 2D display images each in a plane with reference to an axis that is determined on the basis of a shape feature of the corresponding cell and display the 2D display images in a list.

According to another aspect, the present invention provides an image processing device including at least one processor that is provided with hardware, wherein the at least one processor is configured to: generate, on the basis of a plurality of 2D images acquired by a microscope at different focus positions on a plurality of cell clumps, 3D images of the respective cell clumps; process the generated 3D images and analyze feature amounts on the basis of at least one measurement parameter; display analysis results in a graph; allow a user to select a region of interest on the displayed graph; and generate, from the 3D images that correspond to the plurality of cell clumps that are included in the selected region of interest, 2D display images each in a plane with reference to an axis that is determined on the basis of a shape feature of the corresponding cell clump and display the 2D display images in a list.

According to another aspect, the present invention provides a microscope system including: any one of the above-mentioned image processing devices; and a microscope that acquires the plurality of 2D images at different focus positions on the cell clump.

According to a still another aspect, the present invention provides a non-transitory computer-readable medium that stores a computer-readable program for implementing a control method for controlling a microscope system, the method including: a step of generating, on the basis of a plurality of 2D images acquired by a microscope at different focus positions on a cell clump, 3D images of respective cells constituting the cell clump; a step of processing the generated 3D images and analyzing feature amounts on the basis of at least one measurement parameter; a step of displaying analysis results in a graph; a step of allowing a user to select a region of interest on the displayed graph; and a step of generating, from the 3D images that correspond to the plurality of cells that are included in the selected region of interest, 2D display images each in a plane with reference to an axis that is determined on the basis of a shape feature of the corresponding cell and displaying the 2D display images in a list.

BRIEF DESCRIPTION OF DRAWINGS

FIG. 4 is a view showing an example table.

DESCRIPTION OF EMBODIMENTS

An image processing device 9 and a microscope system 1 according to one embodiment of the present invention will be described below with reference to the drawings.

Figure 1:
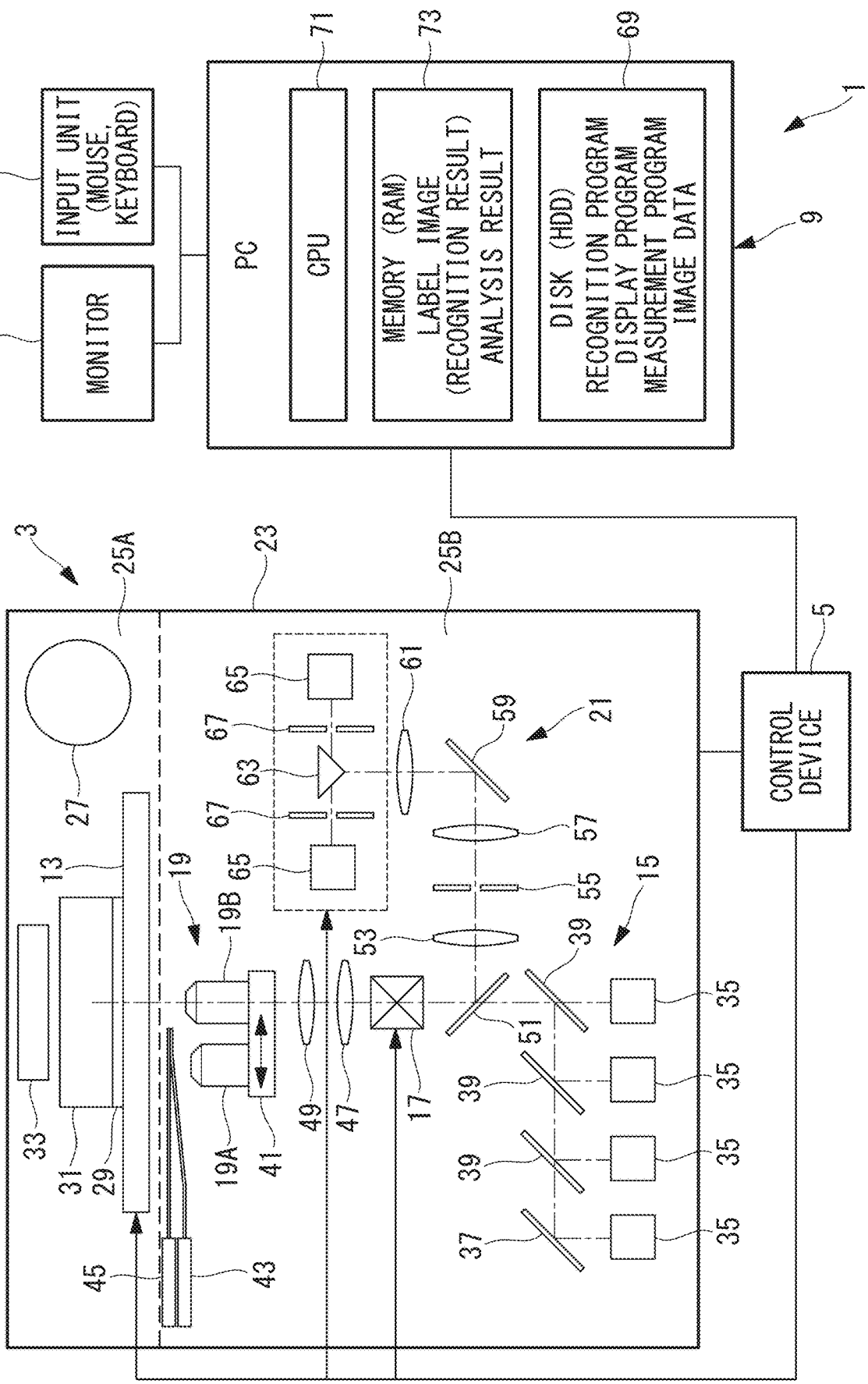
FIG. 1 is a view showing the overall configuration of a microscope system according to one embodiment of the present invention.

As shown in FIG. 1, the microscope system 1 of this embodiment is provided with: a laser scanning microscope (microscope) 3; a control device 5 that controls the laser scanning microscope 3 and that constructs an image; a monitor 7 that displays the image constructed by the control device 5; a PC (Personal Computer, image processing device) 9; and an input unit 11, such as a mouse or a keyboard, through which an operator performs various inputs.

Figure 2:
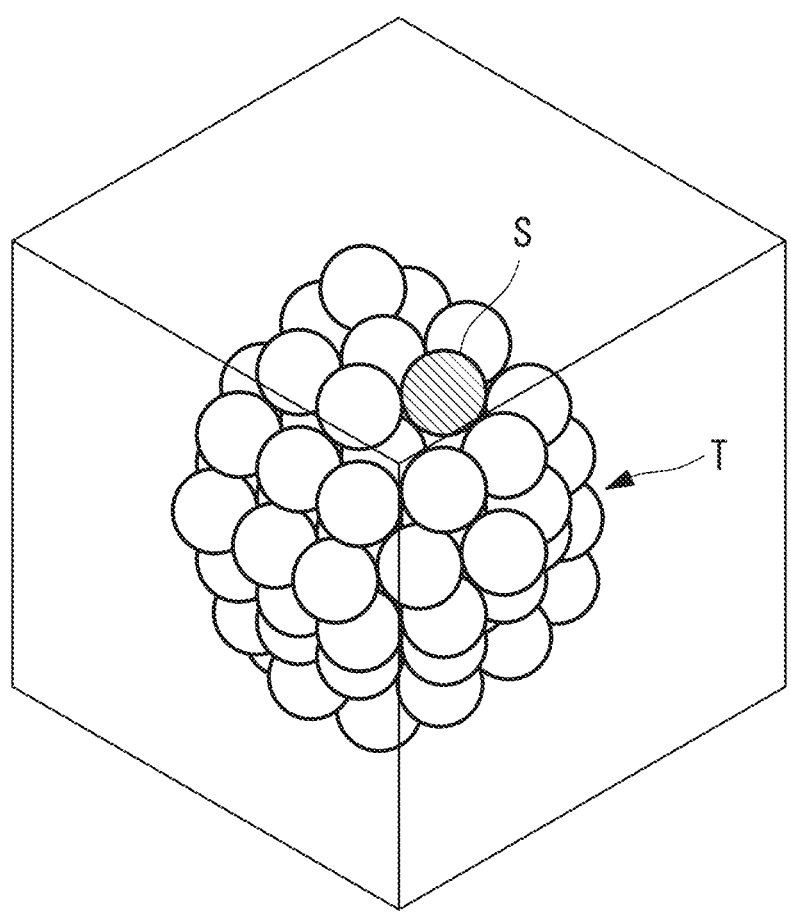
FIG. 2 is a perspective view showing an example cell clump to be observed by the microscope system shown in FIG. 1.

The laser scanning microscope 3 is provided with: a motorized stage 13 on which a transparent container (not shown), such as a petri dish, for accommodating a spheroid (cell clump) T composed of a plurality of cells S (see FIG. 2) is mounted; a laser light source unit 15 that emits laser light; a scanner 17 that two-dimensionally scans the laser light emitted by the laser light source unit 15; an objective lens 19 that focuses the laser light scanned by the scanner 17 onto a cell S; an image acquisition unit 21 that detects fluorescence produced in the cell S when the cell S is irradiated with the laser light through the objective lens 19 and that acquires an image of the cell S; and a dark box 23 that accommodates the above components of the laser scanning microscope 3.

The motorized stage 13 is provided with three motors (not shown), so that the motorized stage 13 moves independently along motion axes in X, Y, and Z directions perpendicular to one another, thus making it possible to move the container mounted thereon in a three-dimensional direction.

The interior of the dark box 23 is divided into an upper area 25A, which includes the motorized stage 13 and is located at an upper side, and a lower area 25B, which is located lower than the upper area 25A. A heater 27 is disposed in the upper area 25A, so that the temperature in the upper area 25A is adjusted to a predetermined culture condition (for example, 27° C.±0.5° C.). A sample holder 29 that is mounted on the motorized stage 13 in a positioned state is disposed in the upper area 25A.

The sample holder 29 can hold, on the motorized stage 13, the container in a positioned state. The container held by the sample holder 29 is accommodated in a simple incubator 31, thus maintaining the culture conditions thereof (for example, humidity of 100% and CO2 concentration of 0.5%). In the figure, reference sign 33 denotes a phase-difference condenser for phase-difference observation.

The laser light source unit 15 is provided with: a plurality of laser diodes 35 that produce laser light at different wavelengths; and a mirror 37 and dichroic mirrors 39 that cause the laser light produced by the plurality of laser diodes 35 to merge into a single light path.

The scanner 17 is, for example, a so-called proximity galvanometer mirror that is formed by opposing two galvanometer mirrors that are made to swivel about axes perpendicular to each other.

The objective lens 19 is provided such that an objective lens 19A for dry observation and an objective lens 19B for oil-immersion or water-immersion observation can be switched by a revolver 41. The objective lens 19 has an auto-focus function, detects an in-focus position periodically or as needed, and is moved in the direction along the optical axis, thereby making it possible to match the focus position of the objective lens 19 with the surface of the cell S.

In the figure, reference sign 43 denotes a pump for supplying immersion oil for oil immersion or water for water immersion to the space between the objective lens 19B and the bottom of the container, and reference sign 45 denotes an airbrush for removing the water or the immersion oil.

A pupil projection lens 47 and an imaging lens 49 that focus the laser light scanned by the scanner 17 are disposed between the scanner 17 and the objective lens 19.

The image acquisition unit 21 is provided with: a beam splitter 51 that is inserted between the laser light source unit 15 and the scanner 17 and that splits off, from the light path of the laser light, fluorescence that is produced by the cell S and that returns vis the objective lens 19, the imaging lens 49, the pupil projection lens 47, and the scanner 17; a confocal lens 53 that focuses the fluorescence split off by the beam splitter 51; a variable pinhole 55; a collimating lens 57; a grating 59 that diffracts the fluorescence converted into approximately collimated light by the collimating lens 57, thus separating the fluorescence into wavelengths; a focusing lens 61 that focuses the fluorescence separated by the grating 59; a beam splitter 63 that splits the focused fluorescence into wavelengths; and light detectors 65 that respectively detect the fluorescence split by the beam splitter 63. The variable pinhole 55 is disposed in an optically conjugate positional relationship with the focus position of the objective lens 19. Reference sign 67 denotes pinholes.

The control device 5 controls driving of the motorized stage 13 and the scanner 17 and constructs an image on the basis of luminance information output from the light detectors 65. For example, the control device 5 moves the motorized stage 13 three-dimensionally with respect to the objective lens 19, thereby moving the spheroid T three-dimensionally with respect to the focus position of the objective lens 19, and, at the same time, the control device 5 causes the scanner 17 to two-dimensionally scan the laser light at each focus position. Then, a slice image (acquired image) of a cell S that is disposed at the focus position of the objective lens 19 is constructed on the basis of a luminance signal output from the light detector 65 that has detected the fluorescence produced by the cell S, and thus, a plurality of slice images of each cell S are acquired.

Then, the control device 5 subjects the plurality of slice images of each cell S to image processing, thereby constructing a 3D image of the entire spheroid T. Data for the plurality of slice images and the 3D image obtained by the control device 5 is sent to the PC 9.

The control device 5 is constituted of: a first communication I/F circuit (not shown) for performing data communication with the PC 9; a second communication I/F circuit (not shown) for performing data communication with the laser scanning microscope 3 in order to control the motorized stage 13, the scanner 17, the light detectors 65, etc.; a CPU (not shown); a memory (not shown); and so on. In order to efficiently generate a 3D image, a GPU (Graphics Processing Unit, not shown) may be provided separately from the CPU.

The image processing device of this embodiment is formed of the PC 9.

The PC 9 is provided with: a disk (HDD (Hard Disk Drive)) 69 that stores various programs, image data, graph data, etc.; a CPU (Central Processing Unit, 3D-image generating unit, analysis unit, region-of-interest selecting unit, analysis-result displaying unit, gallery generating unit) 71 that executes the programs stored in the disk 69; and a memory 73, such as a RAM (Random Access Memory), that stores recognition results and analysis results of the cells S obtained through the execution of the programs in the CPU 71.

The disk 69 stores, as the programs to be executed by the CPU 71, a recognition program, a display program, and a measurement program, for example. The disk 69 stores image data, such as a plurality of slice images of each cell S and a 3D image of the entire spheroid T, acquired by the control device 5.

Through the execution of the recognition program, the CPU 71 performs recognition processing with respect to the entire spheroid T and individual cells S on a 3D image. In the recognition processing, for example, a plurality of LoG (Laplacian Of Gaussian) filters having different sizes are adopted, a local peak position and the size thereof are detected from output values of the LoG filters, and this peak position is set as a seed (the center position of the cell S). Then, the LoG filters are applied two-dimensionally and three-dimensionally, and the results are combined. Next, trimming and, adaptively, binarization processing are applied to a neighborhood region around the seed on the basis of the size thereof, thus forming a region of the recognized cell S.

Figure 3:
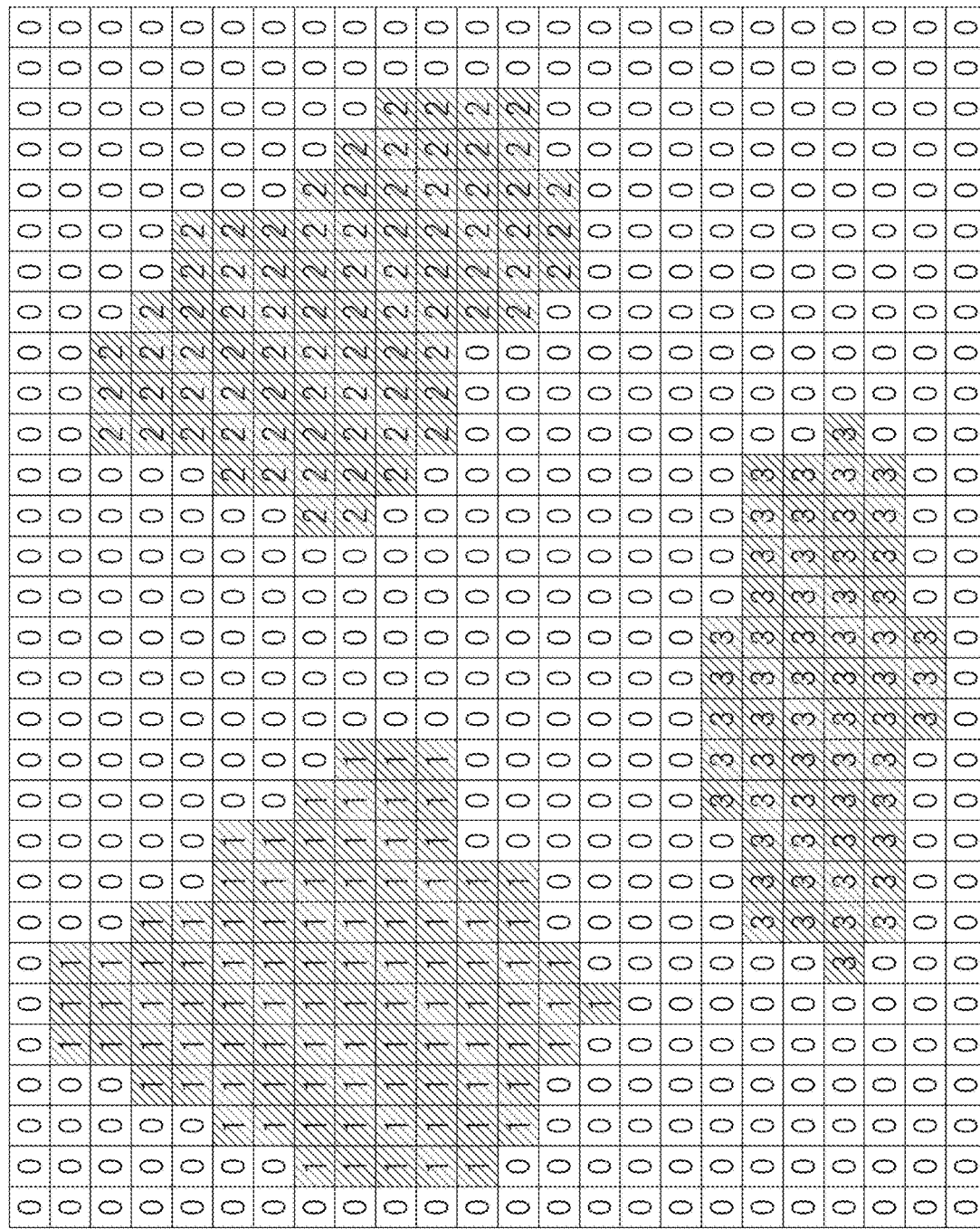
FIG. 3 is a view showing an example label image.

The CPU 71 identifies the recognized entire spheroid T or individual cells S by giving, thereto, labels different from one another, thus generating, for example, a label image, such as that shown in FIG. 3, and a table, such as that shown in FIG. 4. The CPU 71 generates 3D images of the recognized individual cells S.

As shown in FIG. 3, the label image is a 2D image that expresses recognized objects respectively assigned, as the labels, object IDs (for example, 1, 2, 3, 4, . . . , k, . . . n) and an unrecognized background assigned 0. The table is information in which the label (object ID), center position information, and circumscribed rectangle are associated, as shown in FIG. 4. The label image, the 3D images and the table generated by the CPU 71 are stored in the memory 73.

Through the execution of the measurement program, the CPU 71 measures and analyzes, from the 3D images, the recognized individual cells S, which constitute the spheroid T, and generates graphs showing the distribution of characteristics of the measured and analyzed cells S. As the graphs, for example, a histogram, a scattergram, a line graph, etc., can be included. The graphs generated by the CPU 71 are stored in the disk 69.

Figure 5:
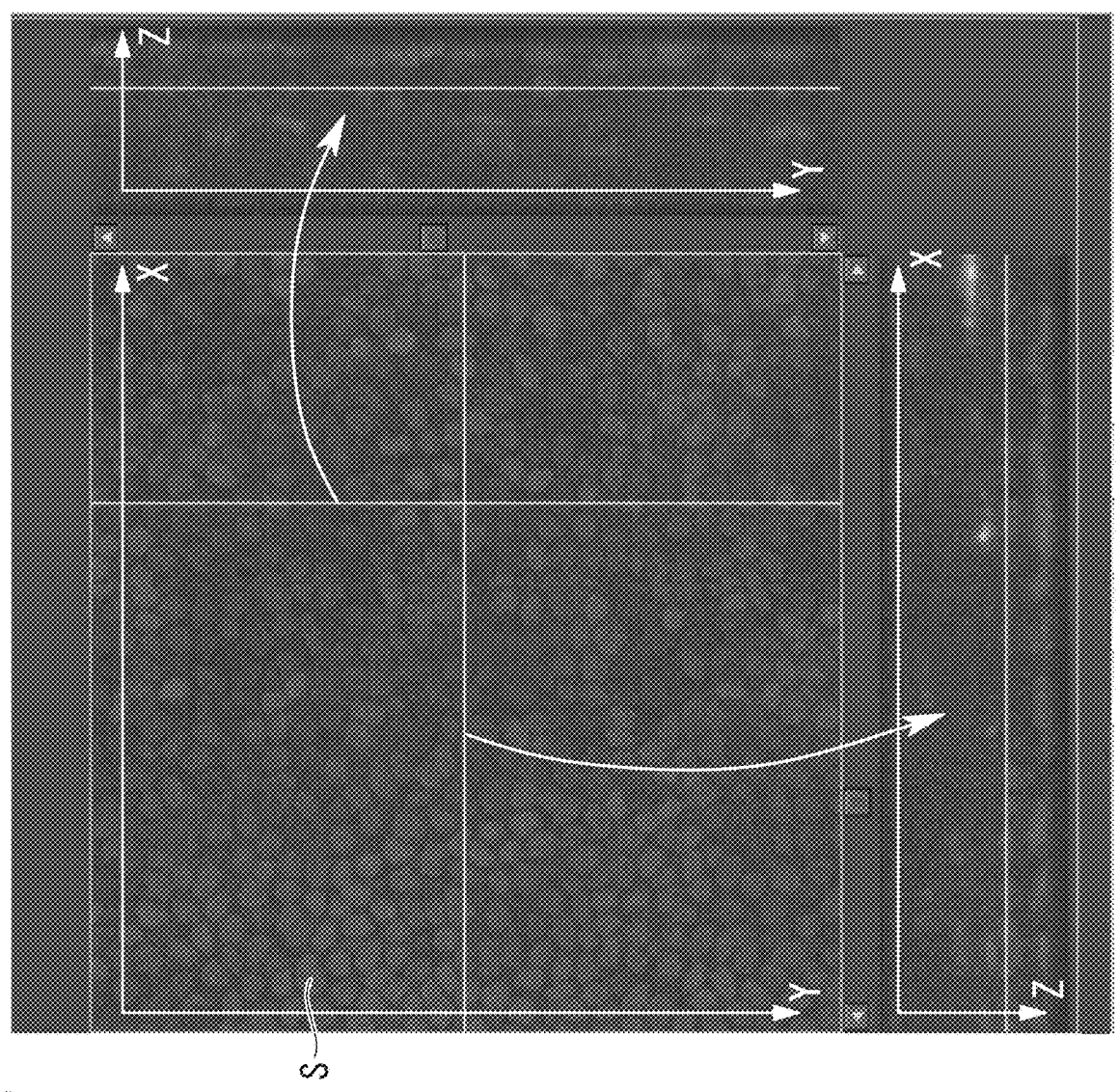
FIG. 5 is a view showing a state in which an XY cross-sectional image, an XZ cross-sectional image, and a YZ cross-sectional image are displayed side by side on a monitor.

Through the execution of the display program, the CPU 71 simultaneously displays three cross-sectional images, i.e., an XY cross-sectional image, an XZ cross-sectional image, and a YZ cross-sectional image, that constitute a 3D image and that are perpendicular to one another, on the monitor 7 in an associated manner, for example, as shown in FIG. 5 (three-plane display). Here, the coordinate axis Z corresponds to the direction of gravity, and an XY plane corresponds to the horizontal direction. The respective cross-sectional images correspond to an acquired image in the XY direction and 2D images formed of cross sections obtained by cutting a 3D image in the XZ direction and the YZ direction.

Figure 6:
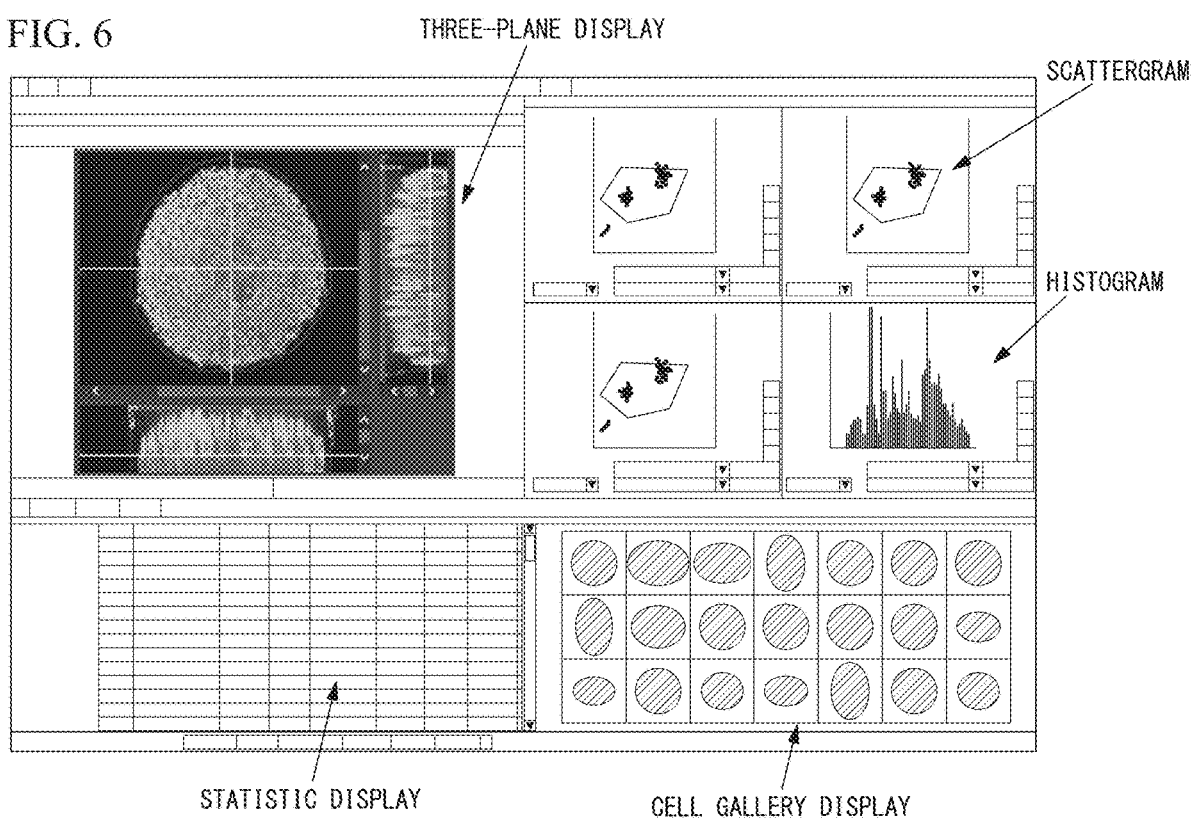
FIG. 6 is a view showing a state in which the respective cross-sectional images, a graph, and a gallery display are displayed side by side on the monitor.

As shown in FIG. 6, the CPU 71 displays, on the monitor 7, the graphs, such as a histogram and a scattergram, and a statistic display that show the distribution of characteristics of the measured and analyzed cells S, side by side with the respective cross-sectional images. Furthermore, the CPU 71 allows a user to select a region of interest on the graphs, such as a histogram and a scattergram, displayed on the monitor 7.

Figure 7:
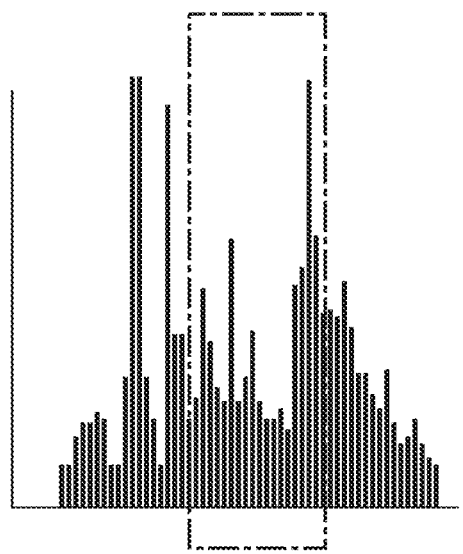
FIG. 7 is a view for explaining a case in which a region of interest is specified on a histogram, in an image processing device provided in the microscope system shown in FIG. 1.

For example, as shown in FIG. 7, the user draws a rectangular diagram on the histogram so as to surround a region of interest, thereby selecting cells S included in the region of interest surrounded by the diagram.

Figure 8:
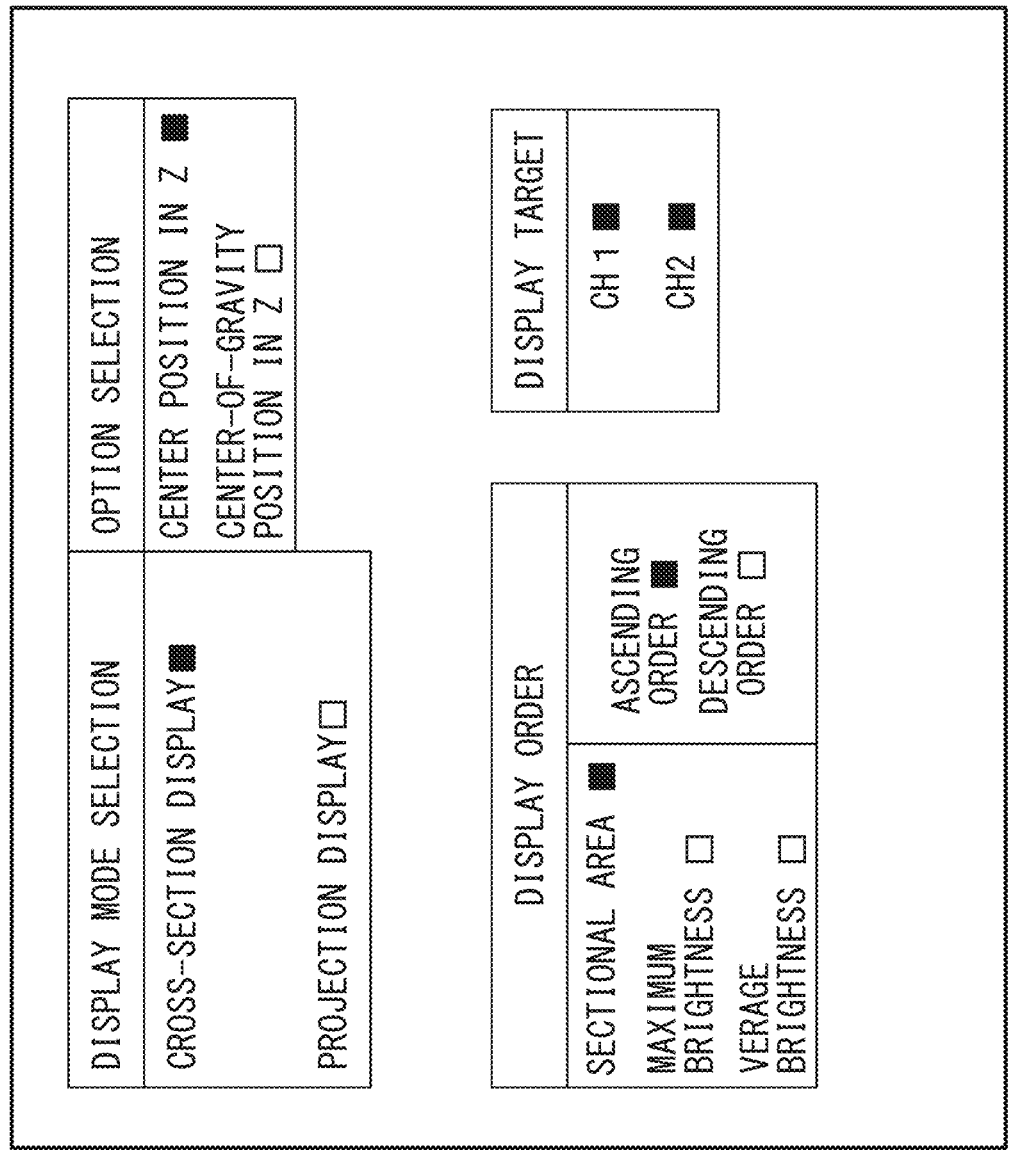
FIG. 8 is a view showing an example screen on which conditions for gallery display are input, in the image processing device provided in the microscope system shown in FIG. 1.

As shown in FIG. 8, the CPU 71 displays, on the monitor 7, a screen for allowing the user to select conditions for gallery display. The conditions for gallery display can include: a display mode indicating the type of images to be displayed; the position, in the cells S, of the images to be displayed; a display order when a list of the images is displayed in a matrix; and a display channel.

The type of images to be displayed can include, for example, a cross-sectional image and a projection image. The cross-sectional image can be, for example, an image in a transverse section perpendicular to the longitudinal axis A of a cell S. The projection image can be, for example, an image in which the maximum brightness in the direction along the longitudinal axis A of a cell S is projected on a plane perpendicular to the longitudinal axis A.

The position, in the cells S, of the images to be displayed can be chosen from, for example, a center position C in the direction along the longitudinal axis A of each of the cells S or a transverse section at a center-of-gravity position G of the cells S.

The display order can be selected from: the order of the size of a transverse section to be displayed; the order of the magnitude of the maximum brightness; or the order of the magnitude of the average brightness. The order can be switched between ascending order and descending order.

As for the display channel, it is possible to choose from: display of an image generated on the basis of fluorescence detected by the light detector 65 of a channel CH1 or CH2; or display of images generated on the basis of fluorescence detected by the light detectors 65 of both channels CH1 and CH2.

When the conditions for gallery display are input, the CPU 71 processes 3D images of the cells S corresponding to all labels searched for as the cells S included in the region of interest, extracts the longitudinal axes A of the respective cells S, generates 2D images of the respective cells S according to the input conditions, and displays the 2D images in a list on the monitor 7.

The operation of the thus-configured image processing device 9 and microscope system 1 will now be described.

First, a description will be given of a case in which a 3D image of a cell S is acquired by using the microscope system 1 of this embodiment.

First, the container is held by the sample holder 29, the container is mounted on the motorized stage 13, and the laser light source unit 15 is made to produce laser light.

The laser light produced by the laser light source unit 15 is two-dimensionally scanned by the scanner 17 and is focused on a cell S in the container via the pupil projection lens 47, the imaging lens 49, and the objective lens 19. At the position irradiated with the laser light, a fluorescent substance existing in the cell S is excited to produce fluorescence. The produced fluorescence returns along the light path of the laser light via the objective lens 19, the imaging lens 49, the pupil projection lens 47, and the scanner 17 and is split off therefrom by the beam splitter 51, thus entering the image acquisition unit 21.

The fluorescence entering the image acquisition unit 21 is focused by the confocal lens 53, and only fluorescence that has passed through the variable pinhole 55 is converted into substantially collimated light by the collimating lens 57. Then, the fluorescence is diffracted by the grating 59, travels via the focusing lens 61 and the beam splitter 63, and is detected by the different light detectors 65 for respective wavelengths. Then, in the control device 5, slice images of the cell S are constructed on the basis of luminance signals output from the light detectors 65, the plurality of constructed slice images are subjected to image processing, and a 3D image is constructed.

In this case, the variable pinhole 55 is sufficiently narrowed down, thereby making it possible to allow only fluorescence that is produced at the focus position of the objective lens 19 to pass therethrough and to be detected by the light detectors 65, and to acquire a clear confocal fluorescence image with no blurring.

Figure 9:
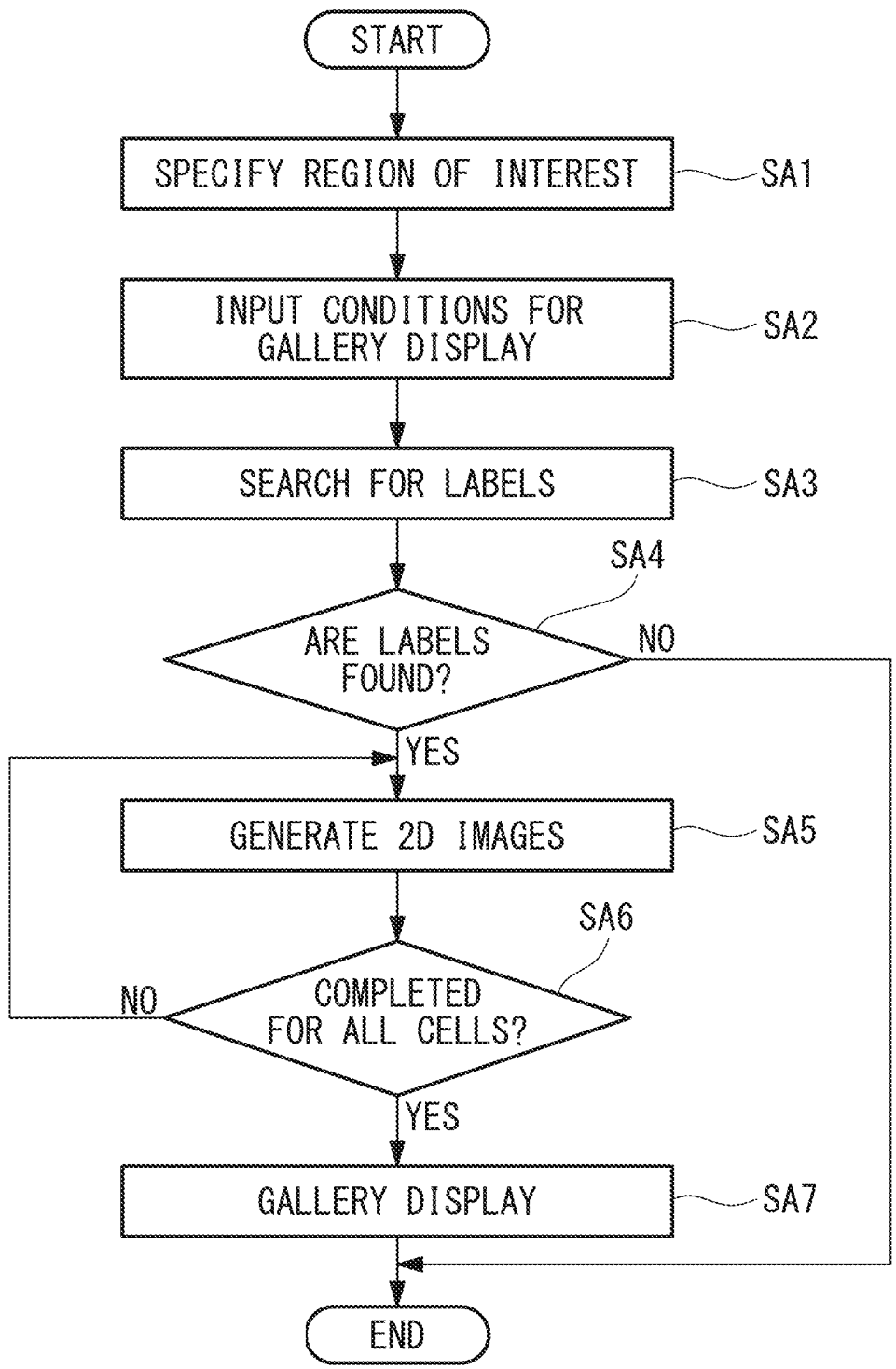
FIG. 9 is a flowchart for explaining a procedure for performing gallery display of individual cells, by using the microscope system shown in FIG. 1.

Next, a procedure for gallery display of 2D images of individual cells S constituting a cell clump T performed by the image processing device 9 and the microscope system 1 of this embodiment will be described with reference to a flowchart shown in FIG. 9.

First, the CPU 71 executes the recognition program, recognizes individual cells S in a 3D image stored in the disk 69, identifies the cells S by giving, thereto, labels different from one another, and generates a label image, such as that shown in FIG. 3, and a table, such as that shown in FIG. 4. 3D images of the recognized individual cells S are generated.

The CPU 71 executes the measurement program, measures and analyzes the recognized individual cells S from the 3D images, and generates graphs showing the distribution of characteristics of the measured and analyzed cells S. Then, the CPU 71 executes the display program and displays an XY cross-sectional image, an XZ cross-sectional image, and a YZ cross-sectional image that constitute a 3D image, and the graphs, such as a histogram, on the monitor 7, side by side in association with one another.

Then, for example, as shown in FIG. 7, when the user specifies, by means of the input unit 11, an arbitrary region of interest on the histogram displayed on the monitor 7 (Step SA1), the CPU 71 displays, on the monitor 7, the screen for allowing the user to select the conditions for gallery display, as shown in FIG. 8 (Step SA2).

Then, the CPU 71 searches the label image and the table, which are stored in the disk 69, for the labels of all cells S included in the region of interest (Step SA3).

If the corresponding labels exist (Step SA4), 2D images of the respective cells S in the region of interest are generated according to the conditions set in the screen shown in FIG. 8 (Step SA5).

Figure 10:
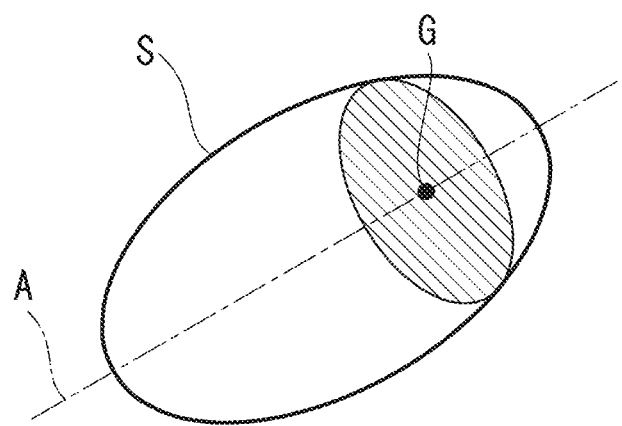
FIG. 10 is a perspective view showing a longitudinal axis and a center-of-gravity position extracted in a 3D image of a cell included in the region of interest shown in FIG. 7, and a transverse section that includes the center-of-gravity position and that is perpendicular to the longitudinal axis.

In a case in which the user selects, for example, as shown in FIG. 8, the cross-sectional image, the center-of-gravity position G, the size of the transverse sectional area, descending order, and both of the channels CH1 and CH2, as shown in FIG. 10, from the 3D images of all cells S included in a specified region of interest, the longitudinal axis A and the center-of-gravity position G of each of the cells S are detected, and a 2D image in a plane (in the figure, a shaded region) that is perpendicular to the longitudinal axis A of the cell S and that includes the center-of-gravity position G, i.e., a transverse sectional image at the center-of-gravity position G of the cell S, is generated.

If the 2D images of the all cells S included in the region of interest are generated (Step SA6), the generated 2D images of the respective cells S are displayed in a list in descending order of the size of the transverse sectional area (gallery display) (Step SA7).

When the user selects only the channel CH1, for example, cells S of which fluorescence images are acquired via the channel CH2 are excluded from the all cells S. When the user selects ascending order, the 2D images of the cells S are displayed in a list in ascending order of the transverse sectional area.

Figure 11:
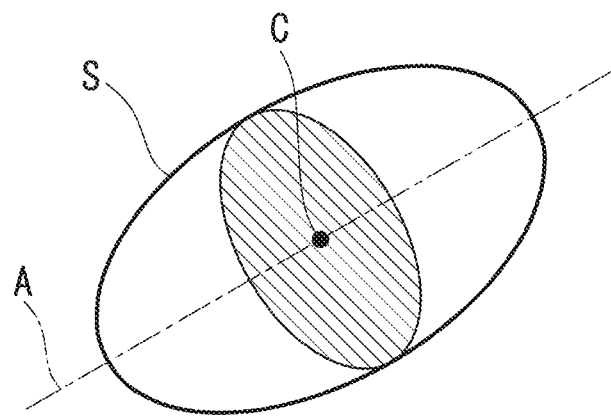
FIG. 11 is a perspective view showing a longitudinal axis and a center position extracted in a 3D image of a cell included in the region of interest shown in FIG. 7, and a transverse section that includes the center position and that is perpendicular to the longitudinal axis.

When the user selects the center position C, as shown in FIG. 11, from the 3D images of all cells S included in the specified region of interest, the longitudinal axis A and the center position C in the longitudinal-axis direction of each of the cells S are detected, and a 2D image in a plane (in the figure, a shaded region) that is perpendicular to the longitudinal axis A of the cell S and that includes the center position C in the longitudinal-axis direction, i.e., a transverse sectional image at the center in the longitudinal-axis direction of the cell S, is generated.

Figure 12:
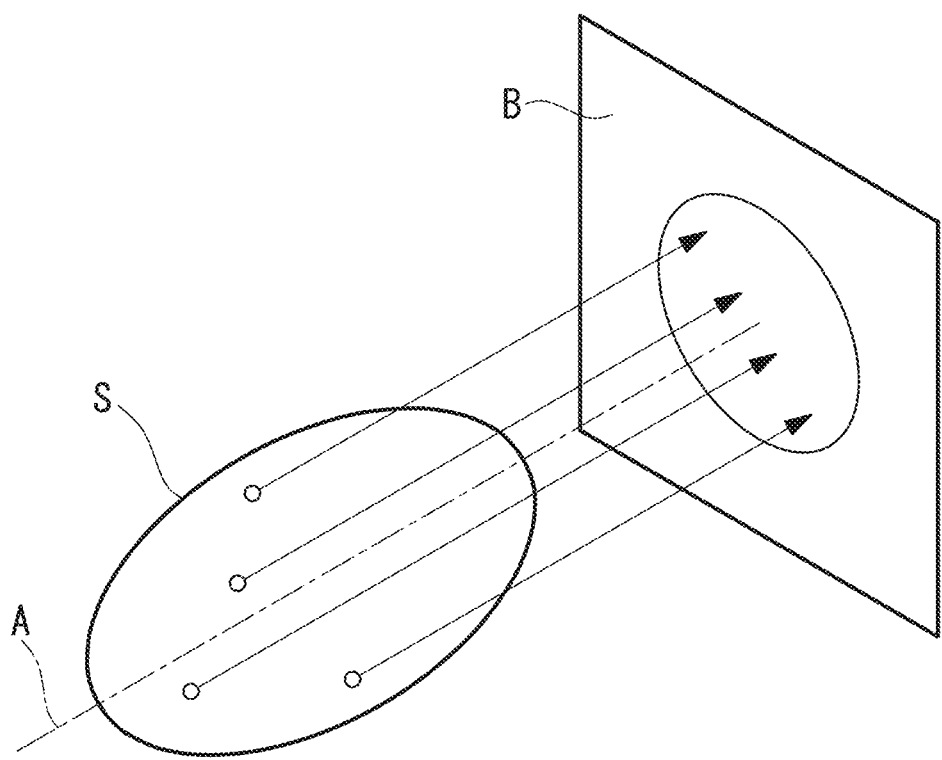
FIG. 12 is a perspective view showing a longitudinal axis extracted in a 3D image of a cell included in the region of interest shown in FIG. 7, and an example projection image in which the maximum brightness value in the cell in the direction along the longitudinal axis thereof is projected on a projection plane perpendicular to the longitudinal axis.

When the user selects the projection image, as shown in FIG. 12, from the 3D images of all cells S included in the specified region of interest, the longitudinal axis A of each of the cells S is detected, and an image in which the maximum brightness in the direction along the longitudinal axis A is projected on a plane B perpendicular to the longitudinal axis A is generated.

In this way, according to the image processing device 9 and the microscope system 1 of this embodiment, because the 2D images of the respective cells S constituting a spheroid T are displayed in a list, the user can compare and observe the states of the cells S at a glance. In this case, there is an advantage in that: the 2D image of each of the cells S is in a plane with reference to the longitudinal axis A, which is an axis determined on the basis of a shape feature of the cell S, thus successfully expressing the shape feature of the cell S; and the 2D image of each of the cells S is generated according to the same reference, thus making is possible to facilitate comparison between the cells S. As a result, it is possible to improve observation accuracy for the morphological features of a cell group or respective cells S acquired in 3D image data.

Figure 13:
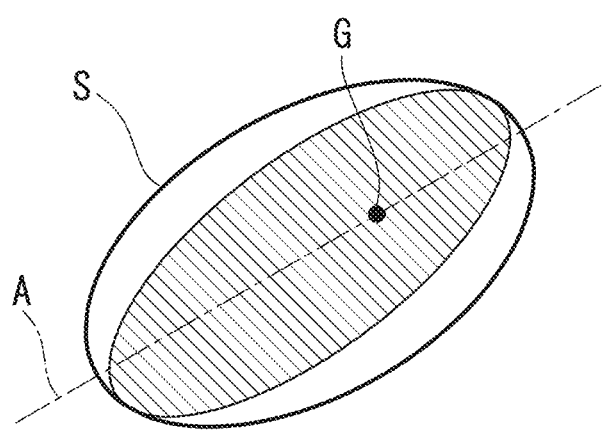
FIG. 13 is a perspective view showing a longitudinal axis and a center-of-gravity position extracted in a 3D image of a cell included in the region of interest shown in FIG. 7, and a longitudinal section that includes the center-of-gravity position and that extends along the longitudinal axis.

In this embodiment, although transverse sectional images in planes perpendicular to the longitudinal axes A of cells S and in the planes including the center positions C in the longitudinal-axis direction or the center-of-gravity positions G are subjected to gallery display, the present invention is not limited thereto, and, for example, as shown in FIG. 13, longitudinal sectional images each in a plane (in the figure, a shaded region) along the longitudinal-axis direction and in the plane including the center-of-gravity position G may also be subjected to gallery display.

In this embodiment, although the conditions for gallery display are input by the user, instead of this, some of the above-described conditions may be set in advance, and, when a region of interest is specified, 2D images of all cells S included in the region of interest may be generated with the set conditions and subjected to gallery display.

When the user specifies any of the cells S in the gallery display, it is also possible to highlight the corresponding scattergram and histogram or the corresponding cell S in an XY cross-sectional image, an XZ cross-sectional image, and a YZ cross-sectional image that constitute a 3D image of a spheroid T. Although the display order in the gallery display is set to the order of the size of the cross sectional area, the order of the magnitude of the maximum brightness, or the order of the magnitude of the average brightness, the present invention is not limited thereto, and it is also possible to perform display in detection order, for example.

Figure 14:
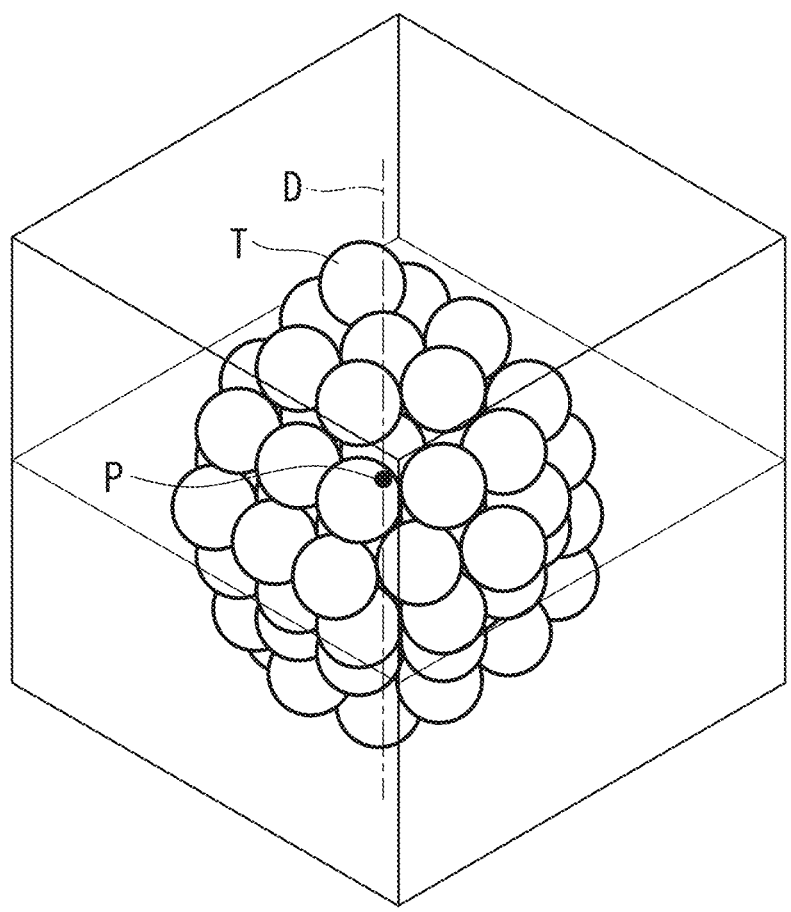
FIG. 14 is a perspective view for explaining a case in which a longitudinal axis and a center-of-gravity position of a cell clump are extracted in the cell clump, and a 2D image in a plane that passes through the center-of-gravity position and that is perpendicular to the longitudinal axis is generated.

In this embodiment, although a description has been given of a case in which individual cells S that constitute a single spheroid T are subjected to gallery display, instead of this, in a case in which a plurality of spheroids T are cultured in a scattered state in the container held by the sample holder 29, as shown in FIG. 14, 2D images each in a plane with reference to an axis (for example, a longitudinal axis D) that is determined on the basis of the shape feature of the corresponding spheroid T (for example, a plane perpendicular to the longitudinal axis D and including the barycenter P) may be generated and subjected to gallery display.

In this embodiment, although the longitudinal axis A or D of a cell S or a spheroid T is shown as an axis determined on the basis of the shape feature of the cell S or the spheroid T, the present invention is not limited thereto.

For example, in a case in which there is no longitudinal axis A, D in a cell clump T that is formed of sphere-shaped cells S or in a sphere-shaped three-dimensional cell clump T, it is also possible to perform gallery display such that 2D images are each in a plane with reference to a Z-axis (optical-axis direction) on the basis of the shape feature of the sphere.

In this embodiment, although the spheroid T is shown as a cell clump, the present invention is not limited thereto, and the present invention may be applied to any of: a three-dimensionally cultured cell group, such as a neurosphere and an organoid; micro-tissue, such as an iPS cell or an ES cell, that is derived and differentiated from a stem cell or that is in a regeneration process; a small animal, such as a nematode, zebrafish, or a mouse; tissue, such as liver, brain, or a tumor; and an embryo at an early stage of development.

In the embodiment, although a configuration in which a region of interest is specified on a histogram, as shown in FIG. 7, has been described, instead of this, it is also possible to specify a region of interest on a scattergram or a line graph.

Although the embodiment of the present invention has been described above in detail with reference to the drawings, specific configurations are not limited to those in this embodiment, and design changes etc. that do not depart from the scope of the present invention are also encompassed. The present invention is not particularly limited to the configurations applied to the above-described embodiment.

As a result, the following aspects are derived from the above-described embodiment.

According to one aspect, the present invention provides an image processing device including at least one processor that is provided with hardware, wherein the at least one processor is configured to: generate, on the basis of a plurality of 2D images acquired by a microscope at different focus positions on a cell clump, 3D images of respective cells constituting the cell clump; process the generated 3D images and analyze feature quantities on the basis of at least one measurement parameter; display analysis results in a graph; allow a user to select a region of interest on the displayed graph; and generate, from the 3D images that correspond to the plurality of cells that are included in the selected region of interest, 2D display images each in a plane with reference to an axis that is determined on the basis of a shape feature of the corresponding cell and display the 2D display images in a list.

According to this aspect, when a plurality of 2D images acquired by the microscope at different focus positions on a cell clump are input, 3D images of respective cells constituting the cell clump are generated by the 3D-image generating unit. The generated 3D images are processed by the analysis unit, thus analyzing feature quantities on the basis of at least one measurement parameter, and analysis results are displayed in a graph by the analysis-result displaying unit.

When the user selects a region of interest on the graph, the gallery generating unit generates, from the 3D images that correspond to the plurality of cells included in the selected region of interest, 2D display images each in a plane with reference to an axis that is determined on the basis of a shape feature of the corresponding cell and displays the 2D display images in a list. Specifically, because the 2D display images of the respective cells displayed in the list are 2D images each in a plane with reference to an axis that is determined on the basis of a shape feature of the corresponding cell, not in an arbitrary transverse section of the cell, the 2D display images are easily compared with one another, and visual observation of morphological features of the respective cells acquired in 3D image data is facilitated, thus making it possible to improve the observation accuracy.

The above-described aspect may further include a storage unit that stores at least one computer program to be executed by the at least one processor.

In the above-described aspect, the axis may be a longitudinal axis of the cell.

By doing so, 2D images each in a plane with reference to the longitudinal axis of the corresponding cell are displayed in a list, thereby making it possible to compare meaningful 2D images as images expressing the shape features of the respective cells, to easily compare the 2D images with one another, to facilitate visual observation of morphological features of the respective cells acquired in 3D image data, and to improve the observation accuracy.

In the above-described aspect, the plane may be a plane that includes a center-of-gravity position of the cell, among planes perpendicular to the longitudinal axis or planes along the longitudinal axis.

By doing so, it is possible to display, in a list, transverse sections of the respective cells at the center-of-gravity positions thereof, to compare meaningful 2D images as images expressing the shape features of the respective cells, and to easily compare the 2D images with one another.

In the above-described aspect, the plane may be a plane that includes a center position in the longitudinal-axis direction, among planes perpendicular to the longitudinal axis.

By doing so, it is possible to display, in a list, transverse sections of the respective cells at the center positions in the longitudinal-axis directions thereof, to compare meaningful 2D images as images expressing the shape features of the respective cells, and to easily compare the 2D images with one another.

In the above-described aspect, the plane may be a plane that includes a center-of-gravity position of the cell, among planes along the longitudinal axis.

By doing so, it is possible to display, in a list, longitudinal sections of the respective cells at the center-of-gravity positions thereof, to compare meaningful 2D images as images expressing the shape features of the respective cells, and to easily compare the 2D images with one another.

In the above-described aspect, the plane may be a plane perpendicular to the longitudinal axis or a plane along the longitudinal axis; and the display images may be images in each of which the maximum value of brightness of pixels arrayed in the longitudinal-axis direction or in a direction perpendicular to the longitudinal-axis direction is projected on the plane.

By doing so, it is possible to display, in a list, images in each of which the maximum value of the pixels in the cell is projected on a plane perpendicular to the longitudinal axis, to compare meaningful 2D images as images expressing the shape features of the respective cells, and to easily compare the 2D images with one another.

According to another aspect, the present invention provides an image processing device including at least one processor that is provided with hardware, wherein the at least one processor is configured to: generate, on the basis of a plurality of 2D images acquired by a microscope at different focus positions on a plurality of cell clumps, 3D images of the respective cell clumps; process the generated 3D images and analyze feature amounts on the basis of at least one measurement parameter; display analysis results in a graph; allow a user to select a region of interest on the displayed graph; and generate, from the 3D images that correspond to the plurality of cell clumps that are included in the selected region of interest, 2D display images each in a plane with reference to an axis that is determined on the basis of a shape feature of the corresponding cell clump and display the 2D display images in a list.

According to this aspect, when a plurality of 2D images acquired by the microscope at different focus positions on a plurality of cell clumps are input, 3D images of the respective cell clumps are generated by the 3D-image generating unit. The generated 3D images are processed by the analysis unit, thus analyzing feature quantities on the basis of at least one measurement parameter, and analysis results are displayed in a graph by the analysis-result displaying unit.

When the user selects a region of interest on the graph, the gallery generating unit generates, from the 3D images that correspond to the plurality of cell clumps included in the selected region of interest, 2D display images each in a plane with reference to an axis that is determined on the basis of a shape feature of the corresponding cell clump and displays the 2D display images in a list. Specifically, because the 2D display images of the respective cell clumps displayed in the list are 2D images each in a plane with reference to an axis that is determined on the basis of a shape feature of the corresponding cell clump, not in an arbitrary transverse section of the cell clump, the 2D display images are easily compared with one another, and visual observation of morphological features of the respective cell clumps acquired in 3D image data is facilitated, thus making it possible to improve the observation accuracy.

The above-described aspect may further include a storage unit that stores at least one computer program to be executed by the at least one processor.

In the above-described aspect, the axis may be a longitudinal axis of the cell clump.

In the above-described aspect, the plane may be a plane that includes a center-of-gravity position of the cell clump, among planes perpendicular to the longitudinal axis or planes along the longitudinal axis.

In the above-described aspect, the plane may be a plane that includes a center position in the longitudinal-axis direction, among planes perpendicular to the longitudinal axis.

In the above-described aspect, the plane may be a plane that includes a center-of-gravity position of the cell clump, among planes along the longitudinal axis.

In the above-described aspect, the plane is a plane perpendicular to the longitudinal axis or a plane along the longitudinal axis; and the display images are images in each of which the maximum value of brightness of pixels arrayed in the longitudinal-axis direction or in a direction perpendicular to the longitudinal-axis direction is projected on the plane.

According to still another aspect, the present invention provides a microscope system including: any one of the above-mentioned image processing devices; and a microscope that acquires the plurality of 2D images at different focus positions on the cell clump.

According to still another aspect, the present invention provides a non-transitory computer-readable medium that stores a computer-readable program for implementing a control method for controlling a microscope system, the method including: a step of generating, on the basis of a plurality of 2D images acquired by a microscope at different focus positions on a cell clump, 3D images of respective cells constituting the cell clump; a step of processing the generated 3D images and analyzing feature amounts on the basis of at least one measurement parameter; a step of displaying analysis results in a graph; a step of allowing a user to select a region of interest on the displayed graph; and a step of generating, from the 3D images that correspond to the plurality of cells that are included in the selected region of interest, 2D display images each in a plane with reference to an axis that is determined on the basis of a shape feature of the corresponding cell and displaying the 2D display images in a list.

REFERENCE SIGNS LIST 1 microscope system
3 laser scanning microscope (microscope)
PC (image processing device)
CPU (analysis unit, region-of-interest selecting unit, analysis-result displaying unit, gallery generating unit, 3D-image generating unit)
A, D longitudinal axis (axis)
C center position
G center-of-gravity position
S cell
T spheroid (cell clump)

The invention claimed is:

1. An image processing device comprising at least one processor that is provided with hardware,
wherein the at least one processor is configured to:
generate, based on a plurality of 2D images acquired by a microscope at different focus positions of a cell clump, 3D images of respective cells constituting the cell clump;
process the generated 3D images and statistically analyze feature quantities based on at least one measurement parameter;
display analysis results of the statistical analysis in a graph;
allow a user to select a region of interest on the displayed graph; and
generate, from the 3D images that correspond to the plurality of cells that are included in the selected region of interest, 2D display images each in a plane with reference to an axis that is determined based on a shape feature of the corresponding cell, and display the 2D display images in a list as a gallery display.

2. The image processing device according to claim 1, further comprising a storage unit that stores at least one computer program to be executed by the at least one processor.

3. The image processing device according to claim 1, wherein the axis is a longitudinal axis of the cell.

4. The image processing device according to claim 3, wherein the plane is a plane that includes a center-of-gravity position of the cell, from among planes perpendicular to the longitudinal axis or planes along the longitudinal axis.

5. The image processing device according to claim 3, wherein the plane is a plane that includes a center position of the cell in a longitudinal-axis direction of the cell, from among planes perpendicular to the longitudinal axis.

6. The image processing device according to claim 3, wherein the plane is a plane that includes a center-of-gravity position of the cell, from among planes along the longitudinal axis.

7. The image processing device according to claim 3, wherein the plane is a plane perpendicular to the longitudinal axis or a plane along the longitudinal axis; and
wherein each of the display images comprises an image in which a maximum value of a brightness of pixels arrayed in the longitudinal-axis direction or in a direction perpendicular to the longitudinal-axis direction is projected on the plane.

8. An image processing device comprising at least one processor that is provided with hardware,
wherein the at least one processor is configured to:
generate, based on a plurality of 2D images acquired by a microscope at different focus positions of a plurality of cell clumps, 3D images of the respective cell clumps;
process the generated 3D images and statistically analyze feature amounts based on at least one measurement parameter;
display analysis results of the statistical analysis in a graph;
allow a user to select a region of interest on the displayed graph; and
generate, from the 3D images that correspond to the plurality of cell clumps that are included in the selected region of interest, 2D display images each in a plane with reference to an axis that is determined based on a shape feature of the corresponding cell clump, and display the 2D display images in a list as a gallery display.

9. The image processing device according to claim 8, further comprising a storage unit that stores at least one computer program to be executed by the at least one processor.

10. The image processing device according to claim 8, wherein the axis is a longitudinal axis of the cell clump.

11. The image processing device according to claim 10, wherein the plane is a plane that includes a center-of-gravity position of the cell clump, from among planes perpendicular to the longitudinal axis or planes along the longitudinal axis.

12. The image processing device according to claim 10, wherein the plane is a plane that includes a center position of the cell clump in a longitudinal-axis direction of the cell clump, from among planes perpendicular to the longitudinal axis.

13. The image processing device according to claim 10, wherein the plane is a plane that includes a center-of-gravity position of the cell clump, from among planes along the longitudinal axis.

14. The image processing device according to claim 10, wherein the plane is a plane perpendicular to the longitudinal axis or a plane along the longitudinal axis; and
wherein each of the display images comprises an image in which a maximum value of a brightness of pixels arrayed in the longitudinal-axis direction or in a direction perpendicular to the longitudinal-axis direction is projected on the plane.

15. A microscope system comprising:
the image processing device according to claim 1; and
the microscope that acquires the plurality of 2D images at the different focus positions of the cell clump.

16. A microscope system comprising:
the image processing device according to claim 8; and
the microscope that acquires the plurality of 2D images at the different focus positions of the cell clumps.

17. A non-transitory computer-readable medium that stores a computer-readable program for implementing a control method for controlling a microscope system, the method comprising:
generating, based on a plurality of 2D images acquired by a microscope at different focus positions of a cell clump, 3D images of respective cells constituting the cell clump;
processing the generated 3D images and statistically analyzing feature amounts based on at least one measurement parameter;
displaying analysis results of the statistical analysis in a graph;
allowing a user to select a region of interest on the displayed graph; and
generating, from the 3D images that correspond to the plurality of cells that are included in the selected region of interest, 2D display images each in a plane with reference to an axis that is determined based on a shape feature of the corresponding cell, and displaying the 2D display images in a list as a gallery display.

* * * * *